3,579,364
PLASTICIZED RESIN COMPOSITIONS
James K. Sears, Webster Groves, Mo., assignor to
Monsanto Company, St. Louis, Mo.
No Drawing. Filed Nov. 21, 1968, Ser. No. 777,913
Int. Cl. C08b 27/52
U.S. Cl. 106—176
21 Claims

ABSTRACT OF THE DISCLOSURE

This invention relates to the use of certain bisphthalimidoacetates as plasticizers for thermoplastic resins.

---

This invention relates to new and useful thermoplastic resinous compositions. In particular, this invention relates to new and improved thermoplastic resinous compositions containing certain bisphthalimidoacetates which improve the physical properties of the starting resin.

Normally, vinyl halide polymers such as polyvinyl chloride and copolymers thereof, which are widely employed in the plastics industry, are quite hard and brittle in nature and require the addition of substantial proportions of a plasticizer to improve their workability. Since some of the plasticizer is ordinarily retained in the plastic product, it is desirable that it possess certain characteristics. Among these desirable characteristics is the ability of a plasticizer to impart low-temperature flexibility to the product. The plasticizer must also be of low volatility to prevent its loss by evaporation. Other desirable characteristics of a plasticizer include low water absorption and leaching. It is also desirable that the plasticizer be one which does not allow the finished product to become hard and brittle and thereby easily factured.

It is accordingly an object of this invention to provide improved thermoplastic resinous compositions.

It is a further object of this invention to provide novel plastic compositions comprising thermoplastic resins and certain bisphthalimidoacetates.

A still further object is to provide new resinous compositions having desirable physical properties.

Other objects and advantages of the invention will be apparent to those skilled in the art from the following detailed description and claims.

In accordance with this invention, it has been found that the above and still further objects are achieved by incorporating a thermoplastic resin and certain bisphthalimidoacetates.

Generally speaking, about 5 to 200 parts by weight of plasticizer can be used for each 100 parts by weight of thermoplastic resin. However, it is preferred to use from about 20 to 100 parts by weight of plasticizer per 100 parts by weight of resin.

The bisphthalimidoacetates of this invention are effective as plasticizers for thermoplastic resins and rubber-like materials. Examples of materials suitable for use with this invention include vinyl chloride polymers or copolymers, polyvinyl acetate, lower alkyl cellulose ethers such as methyl cellulose, ethyl cellulose, butyl cellulose and aralkyl cellulose ethers such as benzyl cellulose, cellulose esters of organic acids having 2 to 4 carbon atoms such as cellulose acetate, cellulose propionate, cellulose butyrate, cellulose acetate-butyrate and cellulose acetate-propionate, vinyl aromatic resins such as polystyrene, rubbery polymers such as the copolymers of butadiene with styrene or acrylonitrile and the terpolymer of acrylonitrile, butadiene and styrene, and polymers of α-monoolefins having 2 to 10 carbon atoms such as the polymers and copolymers of ethylene, propylene, butene-1 and the like. Polymers of methyl methacrylate suitable for use in the practice of this invention include homopolymers of methyl methacrylate or copolymers with minor amounts, for example, up to 25% by weight, of another ethylenically unsaturated monomer copolymerizable therewith, for example, acrylic acid, methacrylic acid, the 1 to 4 carbon alkyl (i.e., methyl to butyl) esters of acrylic acid, the 2 to 4 carbon alkyl (i.e., ethyl, propyl and butyl) esters of methacrylic acid, vinyl acetate, acrylonitrile, various amides and styrene.

This invention is particularly applicable to halogen-containing vinyl resins. Thus, there may be employed resins derived from such vinyl compounds as vinyl chloride, vinyl chloroacetate, chlorostyrene, chlorobutadienes, etc. Said resins also include the copolymers of such vinyl compounds and other ethylenically unsaturated monomers copolymerizable therewith. Illustrative are the copolymers of a vinyl halide, such as vinyl chloride, with other monomers such as vinylidene chloride; vinyl esters of carboxylic acids, e.g., vinyl acetate, vinyl propionate, vinyl butyrate, vinyl benzoate; esters of unsaturated acids, e.g., alkyl acrylates such as methyl acrylate, ethyl acrylate, propyl acrylate, butyl acrylate, allyl acrylate, and the corresponding esters of methacrylic acid; vinyl aromatic compounds, e.g., styrene orthochlorostyrene, para-chlorostyrene, 2,5-dichlorostyrene, 2,4-dichlorostyrene, para-ethyl styrene, vinyl naphthalene, α-methyl styrene, dienes such as butadiene and chlorobutadiene; unsaturated amides such as acrylic acid amide and acrylic acid anilide; unsaturated nitriles such as acrylic acid nitrile; esters of α,β-unsaturated carboxylic acids, e.g., the methyl, ethyl, propyl, butyl, amyl, hexyl, heptyl, octyl, allyl methallyl and phenyl esters of maleic, crotonic, itaconic and fumaric acids and the like. It should be recognized that the halogenated resins containing halogens other than chloride, e.g., bromine, fluorine and iodine, are also operable in this invention. The halogenated resins may contain a varying proportion of halogen, depending upon the nature of the resin and its contemplated use. Those copolymers in which a predominant portion, i.e., more than 50% by weight of the copolymer, is made from a halogen-containing vinylidene monomer such as vinyl chloride represent a preferred class of polymers to be treated according to this invention.

The bisphthalimidoacetates useful as plasticizers with this invention have the general formula

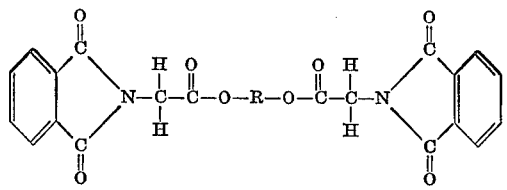

where R is the residue of a dihydric alcohol having from 1 to 18 carbon atoms upon removal of the respective hydroxy groups.

Examples of dihydric alcohols from which R can be derived are: ethylene glycol, diethylene glycol, tetraethylene glycol, pentaethylene glycol, hexaethylene glycol, octaethylene glycol, nonacetylene glycol, decaethylene glycol, dipropylene glycol, tripropylene glycol, dibutylene glycol, dihexylene glycol, decamethylene glycol, dodecamethylene glycol, 1,2-propanediol, 1,3-propanediol, 1,2-butanediol, 1,3-butanediol, 1,4-butanediol, 2,3-butanediol, 2,2-dimethyl-1,3-propanediol, 2,2-dimethyl - 1,3 - butanediol, 2-methyl-2-ethyl - 1,3 - propanediol, 2,3-dimethyl-2,3-butanediol, 2,2-diethyl-1,3-propanediol, 2-ethyl-2-butyl-1,3-propanediol, 2,4-pentanediol, 1,5-pentanediol, 1,4-pentanediol, 1,4-hexanediol, 1,5-hexanediol, 2,5-hexanediol, 1,6-hexanediol, 2-methyl-1,3-pentanediol, 2-methyl-2,5-pentanediol, 3-methyl-1,5-pentanediol, 3-methyl-2,5-pentanediol, 2-methyl-2,4-pentanediol, 2-ethyl-1,3-hexanediol, 2,5-dimethyl-2,5-hexanediol, 2,4-heptanediol, 6-methyl-2,4-heptanediol, 2-butyl-1,3-octanediol, 1,12-octadecanediol, 1-butene-3,4-diol, 2-butene-1,4-diol, 2-butyne-1,4-diol, 2,5-dimethyl-3-hexyne - 2,5 - diol, 2,2-di(hydroxy cyclohexylene) propane, p-phenylene dimethylol and the like.

The plasticizers of the present invention are readily prepared by methods well known in the art. The bisphthalimidoacetates may be prepared by reacting potassium phthalimide with a bischloroacetate. For example, an alkylene glycol such as 1,6-hexamethylene glycol is reacted with chloroacetic acid to form 1,6-hexamethylene glycol bis(chloroacetate) which, in turn, is reacted with potassium phthalimide in the presence of a polar solvent such as dimethyl formamide to obtain 1,6-hexamethylene glycol bis(phthalimidoacetate).

The invention will be more readily understood by reference to the following examples which describe the advantageous and unexpected results achieved by the use of the plasticizers of the present invention in thermoplastic resins. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

The following testing procedures are used in evaluating the physical properties and efficiency of plasticizers.

Compatibility.—Visual inspection of the plasticized composition is employed, incompatibility of the plasticizer with the polymer being demonstrated by cloudiness and exudation of the plasticizer.

Low-temperature flexibility.—Low-temperature flexibility is one of the most important properties of elastomeric vinyl compositions. While many plasticizers will produce flexible compositions at room temperature, the flexibility of these compositions at low temperature may vary considerably, i.e., plasticized polyvinyl chloride compositions that are flexible at room temperature often become very brittle and useless at lower temperatures. Low-temperature flexibility tests herein employed are according to the Clash-Berg Method. This method determines the torsional flexibility of a plastic at various temperatures. The temperature at which the vinyl composition exhibits an arbitrarily established minimum flexibility is defined as the low-temperature flexibility of the composition. This value may also be defined as the lower temperature limit of the plasticized compositions usefulness as an elastomer.

Kerosene extraction.—Resistance to kerosene is measured as follows: A 2″ diameter 40 mil. disc is suspended in a 50° C. oven for a 3-hour conditioning period to eliminated water, then cooled and weighed. The conditioned sample is then immersed in 400 ml. of kerosene for a period of 24 hours at 23° C. The sample is then removed from kerosene, blotted dry and suspended in a force draft 80° C. oven for 4 hours. The sample is then cooled and weighed. The percent loss in weight is reported as the kerosene extraction value.

Water resistance.—The amount of water absorption and the amount of water leaching that take place when the plasticized composition is immersed in distilled water for 24 hours is determined.

Hardness.—A standard instrument made by Shore Instrument Company is used for this determination and expresses the hardness in units from 1 to 100. The hardness of the composition is judged by its resistance to the penetration of a standard needle applied to the composition under a standard load for a standard length of time.

The following examples illustrate the advantageous and unexpected results which are achieved by the use of the plasticizers of the present invention in thermoplastic resinous compositions but it is not intended that this invention be limited by or to such examples.

EXAMPLE 1

One hundred parts by weight of polyvinyl chloride and 67 parts by weight of 1,6-hexamethylene glycol bis(phthalimidoacetate) are mixed on a plastic roller mill to a homogeneous blend. During the milling, substantially no fuming or discoloration is observed. Testing of the molded sheet for low-temperature flexibility, according to the procedure described above, gives a value which denotes good low-temperature properties. Tests of the water resistance of the plasticized material show a slight loss of soluble matter and a low water absorption value. A good Shore hardness value is obtained on this composition. The plasticized material exhibits resistance to extraction by kerosene. A test of the volatility characteristics of the composition gives a negligible value.

EXAMPLE 2

Following the procedure of Example 1, the 1,6-hexamethylene glycol bis(phthalimidoacetate) plasticizer is replaced with 67 parts by weight of each of the following plasticizers:

1,2-propanediol bis(phthalimidoacetate)
1,3-butanediol bis(phthalimidoacetate)
1,4-butanediol bis(phthalimidoacetate)
2,3-butanediol bis(phthalimidoacetate)
p-phenylene dimethylol bis(phthalimidoacetate)
2,2-dimethyl-1,3-propanediol bis(phthalimidoacetate)
2,2-di(4-hydroxycyclohexylene)-propanediol bis (phthalimidoacetate)
2,4-pentanediol bis(phthalimidoacetate)
1,5-pentanediol bis(phthalimidoacetate)
2,5-hexanediol bis(phthalimidoacetate)
1,6-hexanediol bis(phthalimidoacetate)
2-methyl-1,3-pentanediol bis(phthalimidoacetate)
2,2-dimethyl-1,3-butanediol bis(phthalimidoacetate)
2-methyl-2-ethyl-1,3-propanediol bis(phthalimidoacetate)
2,3-dimethyl-2,3-butanediol bis(phthalimidoacetate)
2,4-heptanediol bis(phthalimidoacetate)
2,2-diethyl-1,3-propanediol bis(phthalimidoacetate)
2-ethyl-1,3-hexanediol bis(phthalimidoacetate)
2-ethyl-2-butyl-1,3-propanediol bis(phthalimidoacetate)
ethylene glycol bis(phthalimidoacetate)
diethylene glycol bis(phthalimidoacetate)
dipropylene glycol bis(phthalimidoacetate)
triethylene glycol bis(phthalimidoacetate)
tetraethylene glycol bis(phthalimidoacetate)

The plasticized resin compositions exhibit physical properties similar to those demonstrated in Example 1.

Similar results are obtained when the above bisphthalimidoacetates are compared at levels of 20, 30, 60 and 75 phr. (parts of plasticizer per hundred parts by weight of resin).

The substitution of other vinyl halide-containing resins for the polyvinyl chloride used in the examples, also results in effective plasticization. Similar improved compositions are obtained when the polyvinyl chloride is replaced by an equivalent amount of a copolymer of 95 parts of vinyl chloride and 5 parts of vinyl acetate, a copolymer of 90 parts of vinyl chloride and 10 parts of vinylidene chloride and a copolymer of 70 parts of vinyl chloride and 30 parts of diethylmaleate.

EXAMPLE 3

Individual plasticized compositions are prepared in accordance with the procedure of Example 1 wherein the polyvinyl chloride is replaced in each instance by 100 parts by weight of polymethyl acrylate, 100 parts by weight of polymethyl methacrylate, 100 parts by weight of a copolymer of 98 parts of methyl methacrylate and 2 parts of methacrylic acid, 100 parts by weight of a copolymer of 80 parts of methyl methacrylate and 20 parts of glycidyl methacrylate, and 100 parts by weight of a copolymer of 70 parts of methyl methacrylate and 30 parts of methyl acrylate. In each instance, the results parallel those obtained in the first example.

EXAMPLE 4

Samples of cellulose acetate, cellulose propionate, cellulose acetate butyrate, cellulose nitrate, methy cellulose, ethyl cellulose, butyl cellulose and benzyl cellulose are mixed on a rolling mill to a homogeneous blend with 20 parts by weight of 1,6-hexamethylene glycol bis(phthalimidoacetate) per 100 parts by weight of each thermoplastic resin. The resultant products are pressed into films and are found to be more flexible than films obtained from the thermoplastic resins in the absence of the plasticizer.

EXAMPLE 5

The procedure of Example 1 is repeated except that the polyvinyl chloride is replaced by 100 parts by weight of individual resins, namely, polyethylene, polypropylene, polyvinyl acetate, polystyrene, a copolymer of 40 parts of styrene and 60 parts of acrylonitrile and a copolymer of 70 parts of styrene and 30 parts of acrylonitrile. In each instance, the plasticized resin compositions exhibit physical properties comparable to those demonstrated in the previous examples.

The bisphthalimidoacetates of the present invention may be employed as the sole plasticizer in resin compositions or may be used in combination with other known conventional plasticizers or softening agents commonly employed with such resins. Illustrative of the latter plasticizers are diethyl phthalate, dibutyl phthalate, di-2-ethylhexyl phthalate, dibutyl sebacate, triethyl phosphate, trioctyl phosphate and methyl phthalyl ethylglycolate.

For many purposes, it may be desirable to blend other conventional additives with the plasticized thermoplastic resinous compositions of the present invention. Illustrative of such additives are fillers, dyes, pigments, heat and light stabilizers, lubricants and the like. It will be apparent that compositions containing such other additives are within the scope of this invention.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A composition of matter comprising a thermoplastic resin and a compound having the general formula,

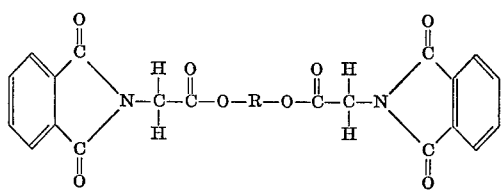

wherein R is the residue of a dihydric alcohol having from 1 to 18 carbon atoms upon removal of the respective hydroxy groups.

2. A comopsition as defined in claim 1 wherein said compound is 1,6-hexamethylene glycol bis(phthalimidoacetate).

3. A composition as defined in claim 1 wherein said compound is present in amounts of from about 20 to about 100 parts by weight per 100 parts by weight of said thermoplastic resin.

4. A composition as defined in claim 1 wherein said thermoplastic resin is a vinyl halide polymer selected from the group consisting of polymerized vinyl halide monomers and copolymers of such monomers with an ethylenically unsaturated monomer, at least 50% of the monomer units of said copolyers being vinyl halide units.

5. A coposition as defined in claim 1 wherein said thermoplastic resin is a vinyl halide polymer selected from the group consisting of polymerized vinyl halide monomers and copolymers of such monomers with an ethylenically unsaturated monomer, at least 50% of the monomer units of said copolymers being vinyl halide units and said compounds is 1,6-hexamethylene glycol bis(phthalimidoacetate).

6. A composition as defined in claim 1 wherein said thermoplastic resin is polyvinyl chloride and said compound is 1,6-hexamethylene glycol bis(phthalimidoacetate).

7. A composition as defined in claim 1 wherein said thermoplastic resin is a polymer of an α-monoolefin having 2 to 10 carbon atoms.

8. A composition as defined in claim 1 wherein said thermoplastic resin is a polymer of an α-monoolefin having 2 to 10 carbon atoms and R is the residue of a dihydric alcohol having from 1 to 18 carbon atoms upon removal of the respective hydroxy groups.

9. A composition as defined in claim 1 wherein said thermoplastic resin is a cellulose ester of an organic acid having 2 to 4 carbon atoms.

10. A composition as defined in claim 1 wherein said thermoplastic resin is a cellulose ester of an organic acid having 2 to 4 carbon atoms and R is the residue of a dihydric alcohol having from 1 to 18 carbon atoms upon removal of the respective hydroxy groups.

11. A composition as defined in claim 1 wherein said thermoplastic resin is a cellulose ester of an organic acid having 2 to 4 carbon atoms and said compound is 1,6-hexamethylene glycol bis(phthalimidoacetate).

12. A composition as defined in claim 1 wherein said thermoplastic resin is a cellulose ether selected from the group consisting of lower alkyl cellulose ethers and aralkyl cellulose ethers.

13. A composition as defined in claim 12 wherein said cellulose ether is ethyl cellulose.

14. A composition as defined in claim 12 wherein said cellulose ether is butyl cellulose.

15. A composition as defined in claim 12 wherein said cellulose ether is benzyl cellulose.

16. A composition as defined in claim 1 wherein said thermoplastic resin is a cellulose ether selected from the group consisting of lower alkyl cellulose ethers and aralkyl cellulose ethers and R is the residue of a dihydric alcohol having from 1 to 18 carbon atoms upon removal of the respective hydroxy groups.

17. A composition as defined in claim 1 wherein said thermoplastic resin is a polymer of methyl methacrylate selected from the group consisting of homopolymers of ethyl methacrylate and copolymers of methyl methacrylate containing at least 75% methyl methacrylate and up 25% of an ethylenically unsaturated monomer copolymerizable therewith.

18. A composition as defined in claim 1 wherein said thermoplastic resin is a polymer of methyl methacrylate selected from the group consisting of homopolymers of ethyl methacrylate and copolymers of methyl methacrylate containing at least 75% methyl methacrylate and up to 25% of an ethylenically unsaturated monomer copolymerizable therewith and R is the residue of a dihydric alcohol having from 1 to 18 carbon atoms upon removal of the respective hydroxy groups.

19. A composition as defined in claim 1 wherein said thermoplastic resin is a polymer of methyl methacrylate selected from the group consisting of homopolymers of ethyl methacrylate and copolymers of methyl methacrylate containing at least 75% methyl methacrylate and up to 25% of an ethylenically unsaturated monomer copolymerizable therewith and said compound is 1,6-hexamethylene glycol bis(phthalimidoacetate).

20. A composition as defined in claim 1 wherein said thermoplastic resin is polymethyl methacrylate.

21. A composition as defined in claim 1 wherein said thermoplastic resin is a copolymer of from about 40 to about 70 parts of styrene and from about 30 to about 60 parts of acrylonitrile.

References Cited

UNITED STATES PATENTS

| 2,824,016 | 8/1958 | Cornwell | 106—186 |
| 2,546,220 | 7/1951 | Fryling | 260—88.7 |
| 2,425,288 | 5/1947 | Tryon | 260—326 |

MORRIS LIEBMAN, Primary Examiner

T. MORRIS, Assistant Examiner

U.S. Cl. X.R.

260—30.2, 32.6

PO-1050
(5/69)

UNITED STATES PATENT OFFICE
CERTIFICATE OF CORRECTION

Patent No. 3,579,364                    Dated May 18, 1971

Inventor(s) James K. Sears

It is certified that error appears in the above-identified patent and that said Letters Patent are hereby corrected as shown below:

Claim 4, line 6, "copolyers" should read -- copolymers --.

Claim 5, line 1, "coposition" should read -- composition --.

Claim 17, line 4, "ethyl" should read -- methyl --.

Claim 17, lines 5 and 6, the word "to" should appear between "up" and "25%".

Claim 18, line 4, "ethyl" should read -- methyl --.

Claim 19, line 4, "ethyl" should read -- methyl --.

Signed and sealed this 21st day of September 1971.

(SEAL)
Attest:

EDWARD M. FLETCHER, JR.
Attesting Officer

ROBERT GOTTSCHALK
Acting Commissioner of Patents